United States Patent [19]

Stanley et al.

[11] Patent Number: 4,691,347
[45] Date of Patent: Sep. 1, 1987

[54] METHOD AND APPARATUS FOR CONTROLLING A CONFERENCE

[75] Inventors: Keith R. Stanley, Winfield; David F. Winchell, Glen Ellyn, both of Ill.

[73] Assignee: American Telephone and Telegraph Company, AT&T Bell Laboratories, Murray Hill, N.J.

[21] Appl. No.: 702,378

[22] Filed: Feb. 15, 1985

[51] Int. Cl.⁴ .............................................. H04M 3/56
[52] U.S. Cl. ..................................... 379/203; 379/204
[58] Field of Search ...................... 179/18 BC, 18 AD; 379/203, 204, 205, 206, 158; 370/62

[56] References Cited

U.S. PATENT DOCUMENTS 3,144,518  8/1964  Lummis ................................ 379/204
3,885,103  5/1975  Smith et al. .
4,305,149 12/1981  Harrison ............................... 370/62
4,317,960  3/1982  Johnson et al. ..................... 379/204
4,317,961  3/1982  Johnson ............................... 379/204
4,475,189 10/1984  Herr et al. ............................ 370/62
4,540,850  9/1985  Herr et al. ........................ 179/2 DP Primary Examiner—James L. Dwyer
Attorney, Agent, or Firm—Charles H. Davis; Richard J. Godlewski

[57] ABSTRACT

A communications network having a dial-up conference arrangement is disclosed. The conference host can summon an operator and cause the conference details to be displayed at an operator position. The detailed information presented to the operator permits the operator to identify conferees independently of the directory number that was used to dial-up the conferee. This permits the operator to redial dropped legs, transfer control of the conference and perform other functions with respect to the identified conferee.

17 Claims, 12 Drawing Figures

T/C INFORMATION DATA TABLE

| REASON FOR REQUEST | ACCESS STATUS | T/C LOC | BRDG TYPE / ID | PORTS REQUESTED / PORTS AVAILABLE |
|---|---|---|---|---|
| CONTROLLER OPTIONS | | | LAST DIGITS DIALED | |
| LEG. ID | STATUS | AUDIO LOCATION | NAME | T/C OPR NOTES |
| 1 | PRIV | X0/1X-XXX-XXXX | HOST | |
| 2 | ONCNF | 212-555-1234 | DOE | |
| 3 | ONCNF | 212-555-1234 | ROE | |
| 4 | DROPPED | 212-555-5678 | SMITH | |
| | | | | |

TOSS STATE DIAGRAM

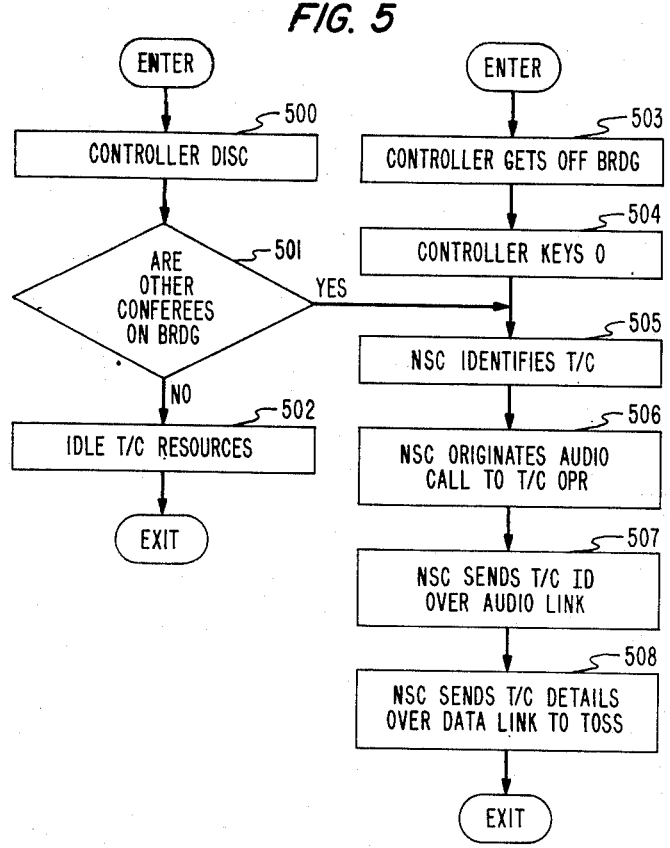
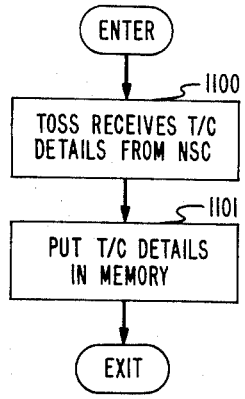

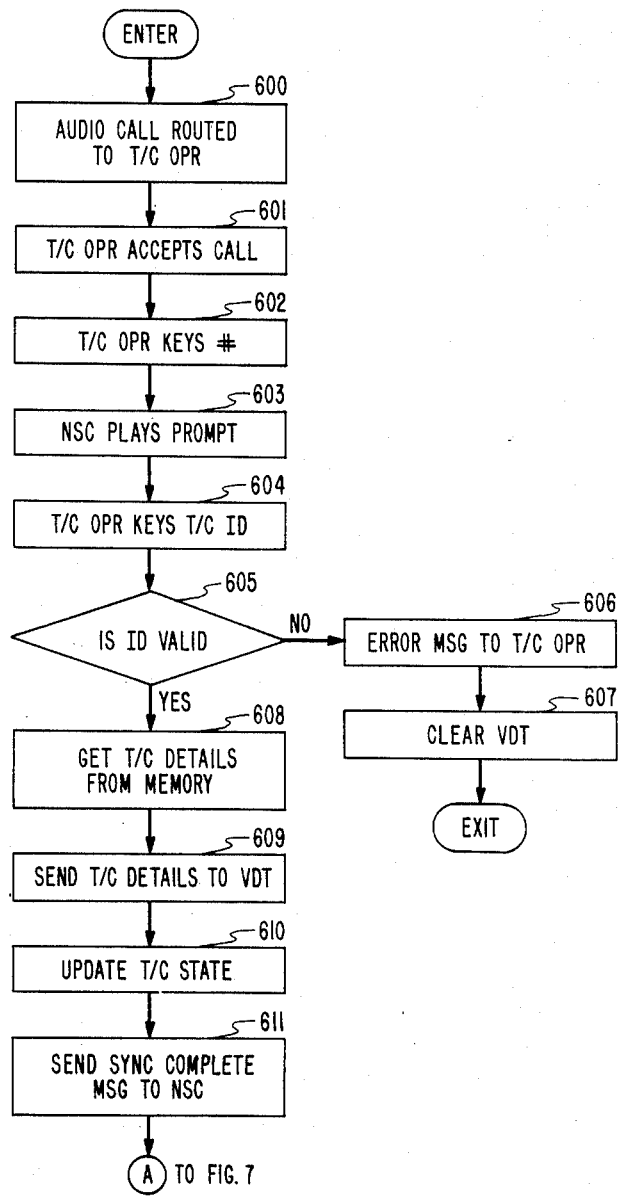

METHOD AND APPARATUS FOR CONTROLLING A CONFERENCE

CROSS-REFERENCE TO RELATED APPLICATIONS

This application is related to the applications of K. R. Stanley and David F. Winchell, Ser. No. 702,389 now U.S. Pat. No. 4,653,045, filed concurrently with this application on Feb. 15, 1985, and Ser. No. 761,068 now U.S. Pat. No. 4,635,251, filed on July 31, 1985.

TECHNICAL FIELD

This invention relates to communication systems, and particularly to conference arrangements. In a more particular aspect, this invention relates to method and apparatus for controlling a conference arrangement. In a still more particular aspect, this invention relates to method and apparatus for identifying individual conferees on a conference for the purpose of reestablishing connections to conferees that have been disconnected from a conference, transferring control, putting a conferee in a privacy mode, etc.

BACKGROUND OF THE INVENTION

In a communication network it is desirable to provide conference arrangements whereby many customers can be bridged together on a conference call. In the so-called "dial-up" conference arrangements, each conferee is summoned at the appropriate time by establishing a communication path to the customer station. The customer is informed that he or she is wanted for a conference call and then added to the conference bridge where the customer can talk with the other conferees on the bridge.

When dial-up type conference arrangements are under the control of an operator, the operator's position can be furnished with supervisory equipment to permit the operator to monitor continuously the status of each conference leg on the bridge in order to ascertain when a conferee answers, disconnects or is added to the bridge. Thus, the operator can inform the conferees on a conference when a party is to be added to or disconnected from the bridge.

If the conference is to be controlled from a customer station, it is generally not practical to provide each customer station with a supervisory capability similar to that of an operator's position.

Accordingly, without such supervisory capability, if a conferee inadvertently disconnects or the connection to the conferee's station is interrupted by an equipment failure, the absence of that conferee might go unnoticed by the remaining conferees.

In one known prior art arrangement, whenever a conferee disconnected from a conference, the conferees remaining on the bridge would hear a warning tone indicating that someone had left the conference. If the disconnect was unexpected the host of the conference would leave the conference and an announcement was played to the host informing the host of the directory number of the conferee that disconnected. The host could then enter an abbreviated code causing the automatic redialing of that directory number and the reconnection of the dropped conference leg.

While this arrangement was wholly suitable for its intended purpose, the arrangement lacked certain features. For example, if several conferees disconnected at the same time, it was difficult for the host to discern which conferee leg was inadvertently disconnected and which leg disconnected on purpose. Thus, the dialing of the abbreviated code may cause the wrong leg to be reconnected.

In addition, certain conferees that are served by a private branch exchange without the direct-inward-dialing feature, do not have individual directory numbers for each of their stations. These conferees are accessed by dialing the main directory number of the private branch exchange and asking the PBX attendant for the specific conferee by name of extension number. Consequently, on a customer originated dial-up conference the host has difficulty distinguishing between a plurality of conference legs that are accessed by the same private branch exchange directory number making it difficult to perform such tasks as transferring control of the conference to one of these legs, putting the leg in a privacy mode, etc.

SUMMARY OF THE INVENTION

The foregoing problem is solved and a technical advance is achieved by a dial-up conference arrangement wherein the details of the conference legs can be displayed at an operator position to permit the operator to identify the conferees, independently of the directory number dialed to access the leg.

More specifically, upon detecting a dropped leg, the host of the conference can summon an operator and cause the conference status to be displayed on a video display terminal at the operator's position. In addition to the directory number used to access each conferee, the display can contain information uniquely identifying the conferee, such as, the conferee's name, extension number, whether or not the leg is on the bridge, etc. Moreover, the operator's position includes apparatus which permits the operator to single out each leg in a privacy mode to identify the conferee connected thereto.

BRIEF DESCRIPTION OF THE DRAWING

FIGS. 5-11 are flow diagrams depicting the overall operation of the system.

DETAILED DESCRIPTION

Figure 1:
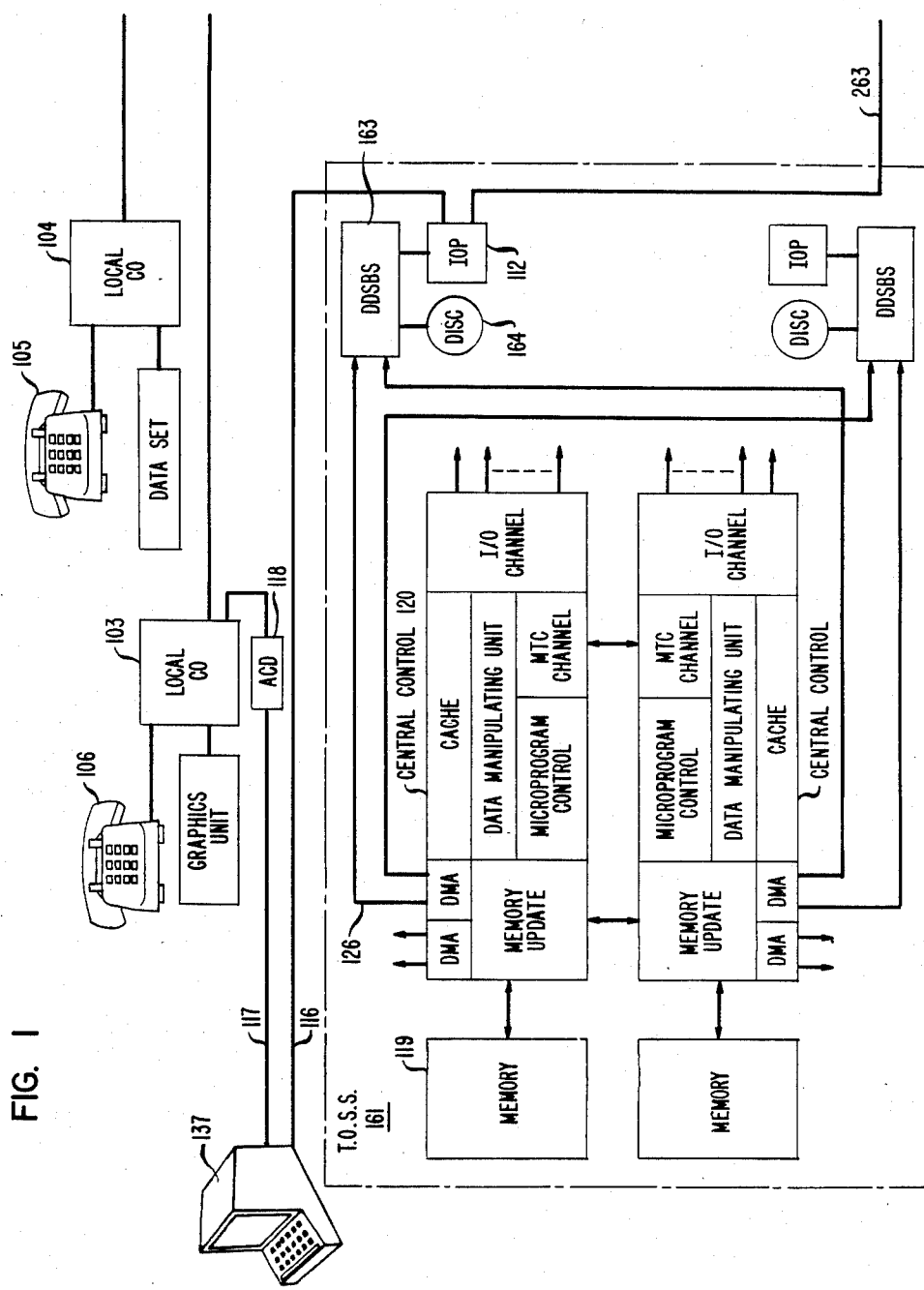
FIGS. 1 and 2, when arranged according to FIG. 12, show a block diagram of a typical telephone network having an interactive conference arrangement with the teleconference operator support system connected thereto.
Figure 2:
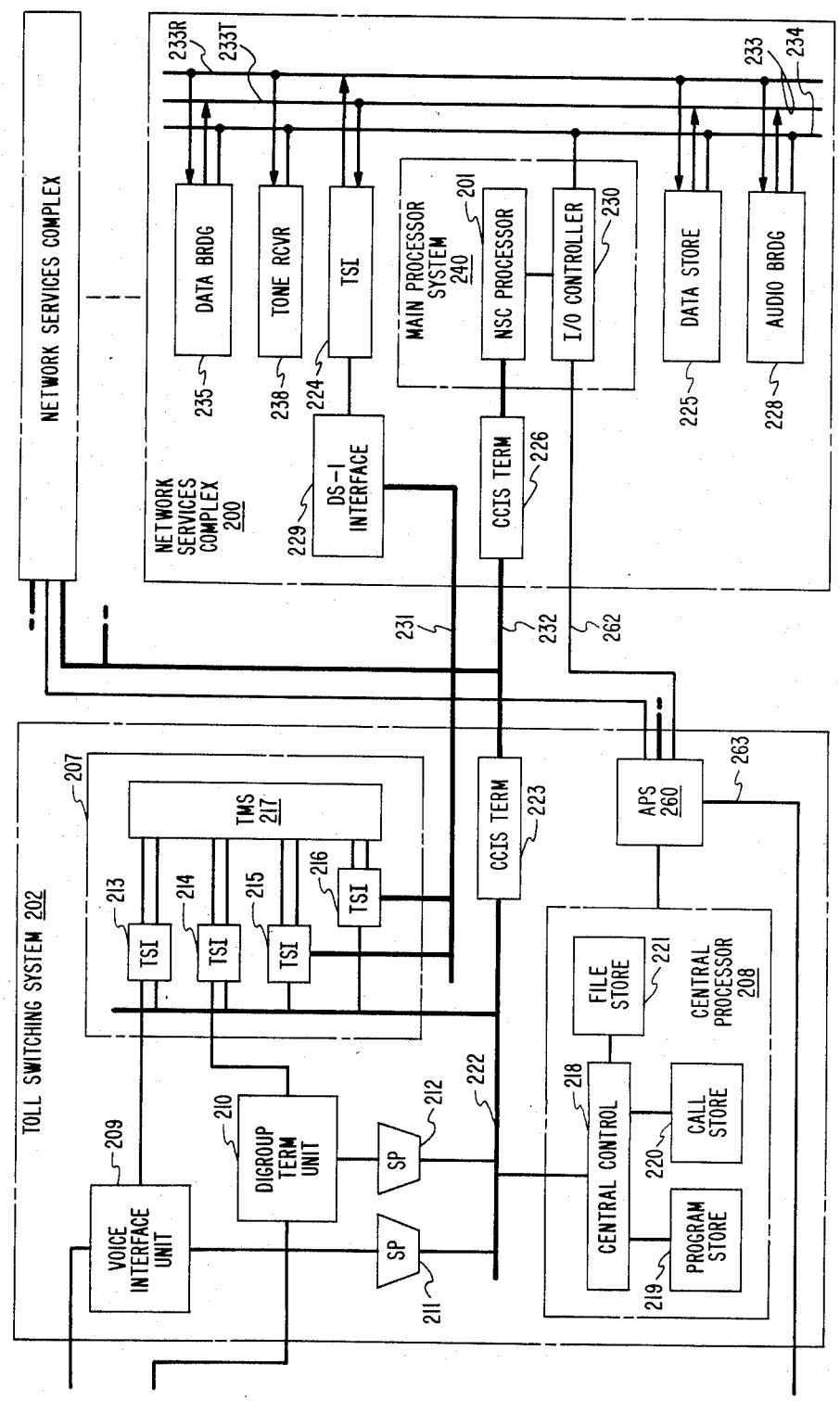

The general organization of a system employing the invention is illustrated in the block diagram of FIGS. 1 and 2 which show a typical communications network having a toll switching system 202 which serves local telephone central offices 103 and 104. Central offices 104 and 103 contain the switching apparatus for providing telephone service to customer stations 105 and 106, respectively. Connected to switching system 102 is teleconference operator support system 161 serving operator position 137. Also connected to switching system 202 is a plurality of network services complexes, such as 200.

Network services complex 200 is an interactive special service facility which includes a main processor system 240, data store system 225, audio bridge system 228, data bridge system 235, tone receiver system 238 and other units. As will be described in more detail below, one of the functions of complex 200 is to provide interactive conferencing with announcements and instructions to customers over the telephone network via the toll and local switching offices.

Toll switching system 202, as depicted in FIG. 2, is a typical switching system, such as the electronic switch described in detail in the *Bell System Technical Journal,* Vol. 56, No. 7, Sept. 1977, and need not be fully described herein for the reader to understand the present invention.

Switching system 202 comprises a network 207, a central processor 208, voice interface unit 209, digroup terminal unit 210, signal processors 211 and 212, attached processor system 260 and miscellaneous equipment units that have not been shown to simplify the drawing.

Network 207 has a time-space-time switching configuration utilizing time slot interchange (TSI) units 213-216, and time multiplexed switch (TMS) unit 217.

Access to the switching network 207 is via serial pulse code modulation links each accommodating 120 voice channels. However, central offices 103 and 104 can be connected to toll switching system 202 via analog or digital transmission facilities. Thus, as seen in FIGS. 1 and 2, local central office 103 is connected to the toll office over the digital facilities which terminate in digroup terminal unit 210, while local office 104 is connected via analog trunks to voice interface unit 209. Digroup terminal 210 performs the multiplexing and demultiplexing between the interoffice transmission facilities and network 207 and also processes signaling information via signal processor 212.

The analog trunks are terminated in a voice interface unit such as 209 whose principal function is analog-to-digital conversion (and vice versa) plus formating digital data for the TSI units. Voice interface unit 209 communicates with the central control via signal processor 211.

Signal processor 211 provides the scan, distribute and digit reception tasks for analog trunks, while signal processor 212 performs the equivalent tasks for the digital trunks except that instead of physical scan and distribution points, the supervisory states of each trunk are stored in a memory in the signal processor.

The majority of the logic, control, storage and translation functions required for the operation of the toll switching system are performed by central processor 208. A typical processor suitable for use in the illustrative toll switching system is described in the *Bell System Technical Journal,* Vol. 56, No. 2, Feb. 1977.

Central control 218 is the information processing unit of the system and executes the program instructions resident in program store 219 using the call processing data in call store 220. Central control 118 communicates with the peripheral units via bus 222.

Switching system 202 is also equipped with an attached processor system 260 which directly interfaces with central processor 208 and the input/output controller in each network services complex served by the switching system. Among its many functions, the attached processor 260 performs certain maintenance and administrative tasks for switching system 202. In addition, the attached processor system 260 provides a means for exchanging data between the teleconference operator support system 161 and the many network services complexes.

As mentioned above, interoffice signaling information is extracted from the transmission paths of analog and digital trunks by signal processors 211 and 212, respectively, and used by central control 218 for call processing. However, the signaling for certain trunks may be transmitted between the offices over a common data link separate from the transmission paths using a common channel interoffice signaling system. A typical common channel interoffice signaling system is described in the *Bell System Technical Journal,* Vol. 57, No. 2, Feb. 1978, and is represented herein by CCIS blocks 223 and 226 and data link 232.

Coupled to the toll switching system is a plurality of interactive special service systems, such as network services complex 200. Complex 200, which is typical of all complexes, comprises a main processor system 240, a data bridge system 235, an audio bridge system 228, CCIS terminal 226, DS-2 interface 229, time slot interchange 224, data store announcement system 225 and a tone receiver system 238. Network services complex 200 can also include other units such as additional conferencing bridges, speech recognition systems, data processing units, etc.

The network services complex is disclosed in U.S. Pat. No. 4,475,189 which issued on Oct. 2, 1984 to D. E. Herr, R. Metz, L. E. Suk, P. R. Wiley and D. F. Winchell and the reader is directed to that disclosure for a more detailed description of the network services complex. In order to appreciate how the present invention is utilized in a system having a network services complex, a brief overview of the complex and its various subsystems will be given herein, but it will be obvious to one skilled in the art that the present invention is equally applicable to other interactive systems without departing from the spirit and scope of the invention.

It is intended that network services complex 200 function with many different types of switching systems to provide several special services in addition to those mentioned above. As such, complex 200 has been designed to connect to a switching system via conventional interoffice trunks 231 and a CCIS type data link 232. The interoffice trunks 231 serving complex 200 are digital facilities similar to the trunks between toll office 202 and local office 203 as described above, and the data link 232 and its terminals are similar to those described in the 1978 *Bell System Technical Journal* cited above. Although these terminals are referred to as CCIS terminals, it is not essential that they be integrated in the CCIS signaling system used for call processing in the network. Complex 200 is also coupled to the teleconference operator support system 161 via attached processor system 260 and data links 262 and 263. It is via this data path that information can be exchanged between an operator at position 137 and the network services complex.

The network services complex is modularly designed to allow for various service units to be added. All units are interconnected over a data bus 233 and a control bus 234. The control bus is used by the NSC processor 201 to communicate control, status and error information with the various units in the complex. Program associated data, billing data, etc., which is distinguished from customer data to be conferenced, is also transmitted over control bus 234. Data bus 233, which conveys the customer data to be conferenced, consists of a transmit bus and a receive bus, and each bus is a 256 time slot, time-multiplexed PCM data bus.

Interface 129 connects the T1 trunks from toll switching system 202 to time slot interchange unit 224 which, under the direction of processor 201, switches any time slot in the receive T1 bus or the transmit portion of data bus 233 with any time slot on the T1 transmit bus or the receive portion of data bus 233. Thus, the interface 229, time slot interchange 224, and data bus 233 provide the path for the exchange of voice, conference data, announcements and inband signaling between the toll switching system 202 and units of the network services complex.

The network services complex 200 is controlled by a main processor system 201 which performs or initiates all call processing, maintenance, fault recovery, diagnostics and audits for the entire complex. Processor 201 also interfaces with terminal 226 to transmit and receive messages from the host toll switching system 202, and communicates with the teleconference operator support system 161 via I/O controller 230 and the previously described data path including links 262 and 263 and attached processor system 260.

As mentioned above, the network services complex can be equipped to furnish many interactive services. For purposes of illustration, let it be assumed that the complex is equipped for conferencing with voice prompting. Accordingly, the complex comprises an audio bridge system 228 which is used for combining the digital voice samples of speakers on a conference for distribution to other participants of the conference. Data bridge system 235, on the other hand, receives data from each conferee's data terminal and distributes the data to the other conferees at the correct speed, in the proper format, etc. The term, data, when used with respect to information transmitted by a customer, is meant to include digital representation of video signals, facsimile, signals from devices such as electronic chalk boards, etc., which is separate from the voice and tone signals transmitted by the customer.

Network services complex 200 also includes a data store system 225 for furnishing tones and announcements to instruct the customers in the use of the special services, and a tone receiver system 238 which receives the tone signals representing digits generated by the customer in controlling a conference.

The control interface between the network services complex system and the toll switching system 202 for call set-up is via a main processor system 240. It is via the main processor system that orders are exchanged between the network services complex and the toll switching system and between the network services complex and the teleconference operator support system.

DS-1 interface 129 in this embodiment provides an interface for up to five T1 trunks (120 channels or time slots) which terminate on time slot interchange unit 224. The time slot interchange unit, in turn, functions to switch these circuits with 256 time slots on time multiplexed data bus 233 to interconnect the channels with the various service units in network services complex. Thus, voice, customer data, and signaling information incoming over the toll telephone network from a conferee is forwarded via interface 229, and time slot interchange 224 to the audio and data bridges for conferencing or to the tone receiver for digit detection and collection, while announcements and tones from data store system 225 and conference data from the bridges are transmitted back via the time slot interchange over the toll network to the conferees.

While the interactive conference service provided by the network services complex is intended to be operated and controlled entirely by the user in response to announcement prompts, a need occasionally arises wherein the customer requires the assistance of an operator who is more familiar with the operation of the interactive facility. This could occur if the host of the conference fails to react to a prompt in the correct manner or if a trouble condition is encountered in the system. Also, the host can summon the operator through the use of a key set at the host's station.

To assist in the use of the special services facility, teleconferencing operator support system 161 and operator positions such as 137 are provided. Teleconferencing operator support system 161 contains a general purpose computer which is connected via its input/output processor over data link 263 to the attached processor system 260 at toll switching system 202. The teleconferencing operator support system 161 also communicates with operator positions such as 137 via input/output processor 112 and data link 116.

A typical general purpose processor suitable for use with the teleconferencing operator support system 161 and the attached processor system 260 is the 3B20 processor manufactured by AT&T Technologies, Inc., and described in the January 1983 issue of the *Bell System Technical Journal,* Vol. 62, No. 1, Part II. As set forth in the technical journal, the 3B20 processor is a 32 bit machine comprising a central control, memory, and input/output systems. While the processor as shown in FIG. 1 and in the cited technical journal operates in a duplex mode, it will be obvious to one skilled in the art that a similar processor functioning in a simplex mode would be equally suitable for use in the teleconferencing operator support system 161 and the attached processor system 260.

Communication by the direct memory access circuits 126 of the central control to and from the peripheral devices is accomplished via a duplex dual-serial bus selector 163, which in the case of a duplex processor allows both processors to access a single device. Some of the typical devices that can be accessed via bus selector 163 are disk system 164, input/output processor 112, scan and distribute points, etc.

The input/output processor provides for a wide range of data link facilities by supporting many microprocessor-based peripheral controllers which are programmed to handle a specific terminal or device. Also, the scanner/distributor capability is useful in monitoring and controlling equipment states of peripheral circuits. It is via the peripheral controllers and the scan and distribute points that the teleconferencing operator support system 161 can communicate with and determine the status of the terminals at operator position 137 and the attached processor system 260.

The terminal at position 137 can be any standard asynchronous video display terminal which generates and displays characters utilizing the ASCII code. Examples of terminals suitable for use with this arrangement are the VT100 manufactured by Digital Equipment Corporation, the Hewlett Packard Model 2621B, and many other terminals known to those skilled in the art.

In addition to the standard video display terminal alphanumeric keyboard, position 137 is equipped with a plurality of special function keys, which will be described below, an operator's headset, and a touch-tone key set for transmitting dual tone multifrequency signals over an audio link.

To illustrate the overall operation of the interactive special service facility and particularly how operator assistance is furnished to the facility, a description of a conference call using the network services complex will now be given.

Conference calls can be established in a "meet me" fashion by having all conferees dial an access code at a prearranged time and meet on the same conference bridge. On the other hand, the network services complex is equipped to handle conference of the dial-up variety wherein a conference host or controller establishes a connection to the audio bridge and thereafter dials the directory numbers of the other conferees to be added to the bridge. With the dial-up arrangement, a touch-tone receiver is coupled to the host's audio channel so the host can exercise control over the conference.

As noted above and with reference to FIG. 5, the operator can be summoned to a conference under various circumstances. For example, should a trouble condition occur during a conference or should the host disconnect (box 500), the network services complex would automatically summon the operator. On the other hand the host can summon the operator by actuating the pound or number sign (#) to disconnect from the bridge and then transmitting the digit "0" (boxes 503 and 504).

The network services complex processor 201 recognizes the digit "0" and interrogates its memory to identify the teleconference and ascertains the telephone number of the operator who will provide assistance (box 505). Processor 201 then sends a message over data link 232 to toll switching system 202 requesting that the switching system establish an audio connection via the telephone network to operator position 137 as set forth in box 506.

Prior to this, the operator at position 137 has plugged in a headset, activated the video display terminal thereat and logged into the computer system of teleconferencing operator support system 161. Once the operator has properly logged in, the position console will appear available to the automatic call distributor 118 (FIG. 1), and the operator can process incoming calls, place outgoing calls, or provide assistance to active conferences.

The automatic call distributor 118 provides a means for distributing all incoming calls to several operator positions such as position 137 depending on the availability of such positions during various load conditions.

In addition to ordering the audio connection, network services complex processor 201 identifies the conference for which assistance has been requested and sends the details of the coference to the teleconferencing operator support system (as shown in box 508) via data link 262, attached processor system 260, and data link 263. The teleconferencing operator support system 161 processor receives the details of the conference and stores the information in its memory 119 for subsequent use as depicted by the flow diagram of FIG. 11.

Every conference known to the teleconferencing operator support system 161 occupies a portion of memory 119 associated with central control 120. A conference becomes known to the teleconferencing operator support system if the operator at position 137 had originated the conference and had input the conference data from the position terminal. Similarly, a conference becomes known to the teleconferencing operator support system when the operator is summoned by the network services complex, and the network services complex forwards the details of the conference over the above-described data link.

Figures 3, 12:
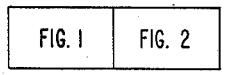
FIG. 3 is a pictorial representation of a portion of the memory in the teleconference operator support system.

FIG. 3 is a graphical representation of a portion of the conference details that are stored in memory 119. At the appropriate time this information will be displayed in a similar manner to the operator on the video display terminal of the operator's position.

As shown in FIG. 3, the information sent to the teleconferencing operator support system 161 includes the reason for requesting the assistance of the operator, i.e., whether the operator was summoned by the conference host, the host disconnected, the host made an error, etc. The access status information includes whether the operator or controller accessed the bridge. Also included in the conference details are the location of the bridge, the type of bridge (audio or graphics) and the conference identification. Insofar as the individual bridges are concerned, the details of the number of ports requested and the number of ports available information is sent to the teleconferencing operator support system 161. The conference details also include the last digits dialed by the host and the dialing options that were available to the host when the operator was summoned. This permits the operator to further evaluate what state the conference was in when the operator was summoned.

The operator is also informed of the details of each leg including the leg identification, the status of each leg (i.e., whether the leg was on the conference, in a privacy mode or has disconnected), which leg is the host, the directory number of the station associated with each leg, and the name of the party on the leg. This last item can be entered by the operator when the conference is established by the operator. Also included in the conference details for each leg can be miscellaneous notes inserted by the operator.

Of course, it will be obvious by one skilled in the art that other conference details such as billing information, etc., can be included in the teleconferencing information data table depicted in FIG. 3.

At this point in the call being described, the network services complex has requested that the toll switching system originates an audio connection to automatic call distributor 118, and the network services complex has sent the details to the conference to the teleconferencing operator support system 161 over data links via the attached processor system 260. NSC processor 201 also orders a touch-tone receiver to be coupled to the audio connection to receive any digits transmitted by the operator.

As shown in FIG. 6 the audio call is routed via the automatic call distributor 118 to an available operator position, and the operator is informed of the call by a zip tone heard in the operator's head set. The operator then accepts the call and actuates the pound (#) key (box 602) on the position to send an answer signal back to the network services complex 200. The network services complex processor recognizes the answer signal and orders data store 225 to play message prompt to the operator (box 603). This message includes the network services complex identification and the bridge identification and will be used by the operator to request the display of the conference details on the video display terminal of operator position 137.

Upon hearing the conference identification, the operator enters the information into the terminal which then transmits the message via data link 116 to central control 120. Central control 120 then interrogates its memory 119 to ascertain if this is a valid identification as shown in box 605. If the central control does not have a record of this conference in its memory, it sends an error message which is displayed on the operator's video display terminal as shown in box 606. The video display terminal screen is then cleared and this portion of the program is exited. The operator can then ask the network services complex to verify the identifications which were sent to the operator. If the conference identification which was entered by the operator is valid as indicated by the execution of the "yes" branch of box 605, the processor extracts the conference details from memory 119 and sends them to the video display terminal at position 137 as set forth in boxes 608 and 609. Central control 120 then updates the conference status and sends a "synchronization complete" message to the network services complex (box 611).

The above-described synchronization procedure permits any available operator to assist on any conference and be apprised on the status of the conference despite what transpired between the conferees and any prior operator that had been summoned to assist them.

The operator's position 137 is equipped with a standard 12-button touch-tone key set for transmitting touch-tone signals over the audio connection as described above. Also included are buttons or keys to move the cursor on the screen, a standard alphanumeric keyboard for inputing data into the teleconferencing operator support system computer and a plurality of special function keys.

Figure 4:
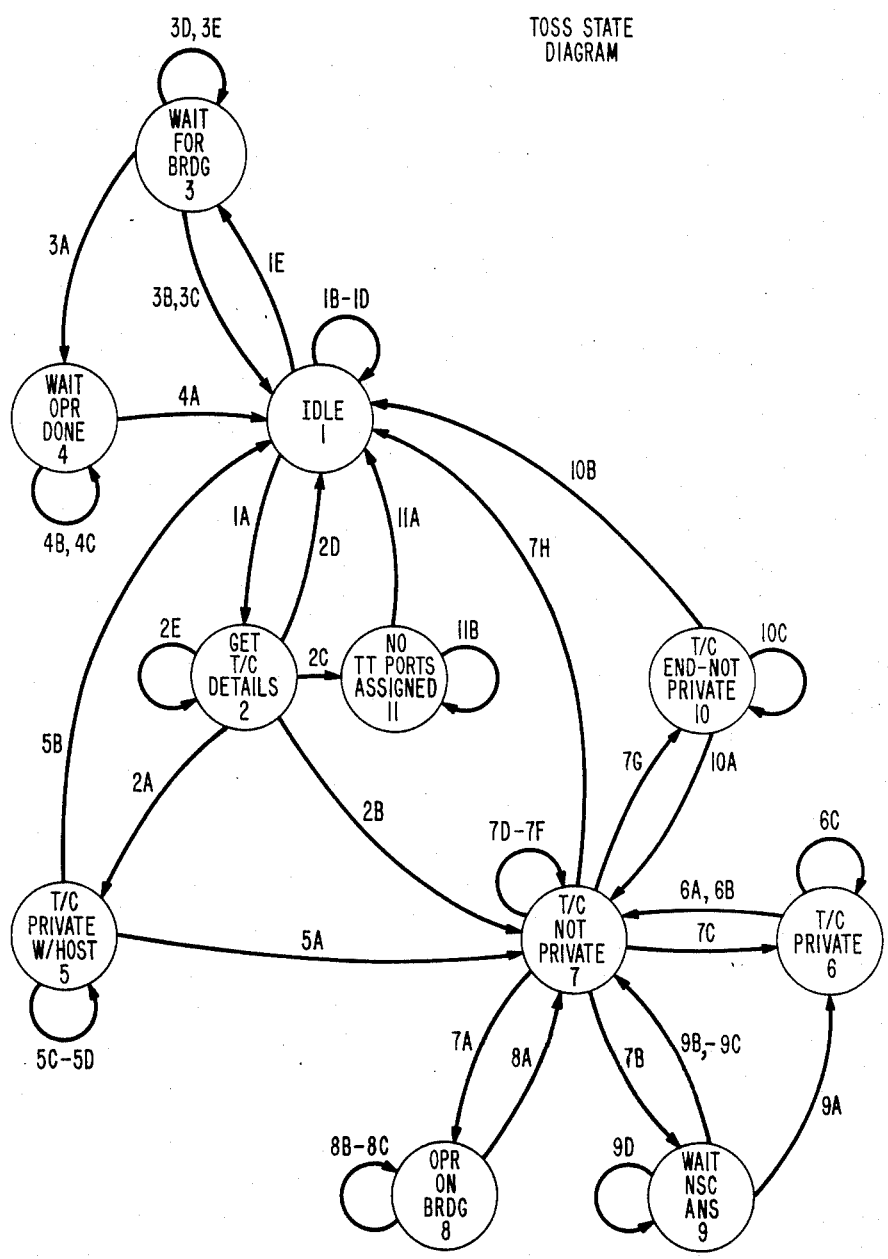
FIG. 4 is a state diagram representing the various states of the teleconference operator support system.

The actuation of a special function key may result in different system operations depending on what state the teleconferencing operator support system is in when a particular function key is actuated. To assist the reader in understanding the overall operation of the teleconferencing operator support system and the operator's position, a state diagram is presented in FIG. 4 which shows the major states that the teleconferencing operator support system assumes. FIG. 4, when viewed with reference to the table in Appendix A, illustrates the action taken and the next state the teleconferencing operator support system is put into as a result of an event received from the operator during a particular state.

For example, in state No. 1, which is the idle state, the operator can key in the conference identification which causes a "get teleconference details" message to be sent to the teleconferencing operator support system central control 120 and the system assumes state No. 2. If the conference identification is valid, ports have been assigned (i.e., the conferees are still on the bridge) and the operator had been summoned by the host and is in a privacy mode with the host, a "synchronization complete" message is sent to the network services complex. In addition, the conference details are displayed to the operator and the system is in state No. 5.

At this point the operator can actuate a REQUEST LOCATION key in preparation for adding a new line to the conference. This causes the cursor to move to a new location on the screen but the system is still in state No. 5. In the alternative, the operator can actuate an ADD CONFEREE key which causes the conferee who is presently in the privacy mode with the operator to be put back on the conference and the system would assume state No. 7. The operator can also actuate an OPERATOR DONE key which causes the operator to be disconnected from the conference bridge, the video display to be cleared from the screen and the system returned to the idle state No. 1.

In addition to the function keys, the terminal at position 137 is equipped with keys for moving the cursor to different positions on the screen. Thus, when the details of a conference are displayed on the screen in a manner similar to FIG. 3, the operator can move the cursor to one of the conference legs and actuate a function key to perform the function designated by that key on the line determined by the relative position of the cursor.

Certain of the function keys and the primary effect of their actuation will now be described. However, it will be appreciated that the precise sequence of events occurring as a result of the actuation of the function key depends on the particular state that the teleconferencing operator support system is in when the key is actuated.

A REQUEST LOCATION key is provided and actuation of this key moves the cursor on the video display terminal to a new location at the bottom of the screen to prepare the teleconferencing operator support system to receive the directory number of a new conferee. After actuating this key the operator would generally enter the telephone directory number, name, etc., of the new conferee using the alphanumeric keyboard at the video display terminal.

After the data of a new conferee is entered the operator may actuate a PLACE CALL key. In response to the actuation of this key, messages are sent to the network services complex causing a call to be established to a party designated by the operator and when the party answers, the party is put in a privacy mode with the operator. If the operator now actuates the ADD CONFEREE key, messages are sent to the network services complex causing the line that is in a privacy mode with the operator to be placed on the conference bridge.

The operator's position is also equipped with an OPERATOR DONE key which can be actuated during various stages of the call. In response to the actuation of the OPERATOR DONE key, control of the conference would be transferred back to the host with the appropriate announcement being played to the conferees. The video display terminal is cleared and the audio path to the operator's position is disconnected.

Should the operator elect to abandon a call in progress to a conferee, the operator can actuate a DISCONNECT key.

The operator's position is also equipped with JOIN CONFERENCE and LEAVE CONFERENCE keys which when actuated cause messages to be sent to the network services complex to place the operator on the bridge or to remove the operator from the bridge.

It should be noted that whenever command messages are sent to the network services complex from the teleconferencing operator support system, the network services complex performs certain routines with respect to the command sent, such as verifying the conference identification, verifying that the command is valid in view of the present state of the conference, etc. If the command message can be properly executed, the network services complex returns a "pass" message to the teleconferencing operator support system indicating the command will be carried out. If the command is invalid or cannot be executed, a "fail" message is returned from the network services complex and the teleconferencing operator support system displays the appropriate error message to the operator at position 137.

The operator has the capability of transferring the control of the conference to any party on the bridge. This is accomplished by moving the cursor on the video display terminal to the conference leg designated to be the new host and thereafter actuating the TRANSFER CONTROL key. Appropriate messages are sent to the network services complex, and the teleconferencing operator support system central control 120 updates the status of the legs involved.

In addition to the ability to transfer control, the operator can take any conferee off the bridge and converse with the conferee in a privacy mode. This is accomplished by moving the cursor on the video display to the selected conferee and actuating the key designated PRIVACY MODE. The privacy mode feature permits an operator to single out an unwanted conference leg and force the disconnect of that leg by actuating a DISCONNECT CONFEREE key. The operator can utilize this method if a defective leg is effecting the transmission or operation of the entire conference or to eliminate an unwanted conferee, etc.

Certain function keys are primarily used for conferences which the operator establishes, such as the REQUEST CONFERENCE key. When actuated this key causes a conference request form to be displayed on a video display terminal at position 137. This form consists of several pages which can be displayed individually by actuating the function key designated NEXT PAGE.

When the operator determines that assistance is no longer required, the operator actuates the OPERATOR DONE and NEXT CALL keys which clear the data display from the video display terminal and disconnect the voice path between the operator position and the network services complex, thus making the operator's position available to the automatic call distributor 118 for another call.

Figure 7:
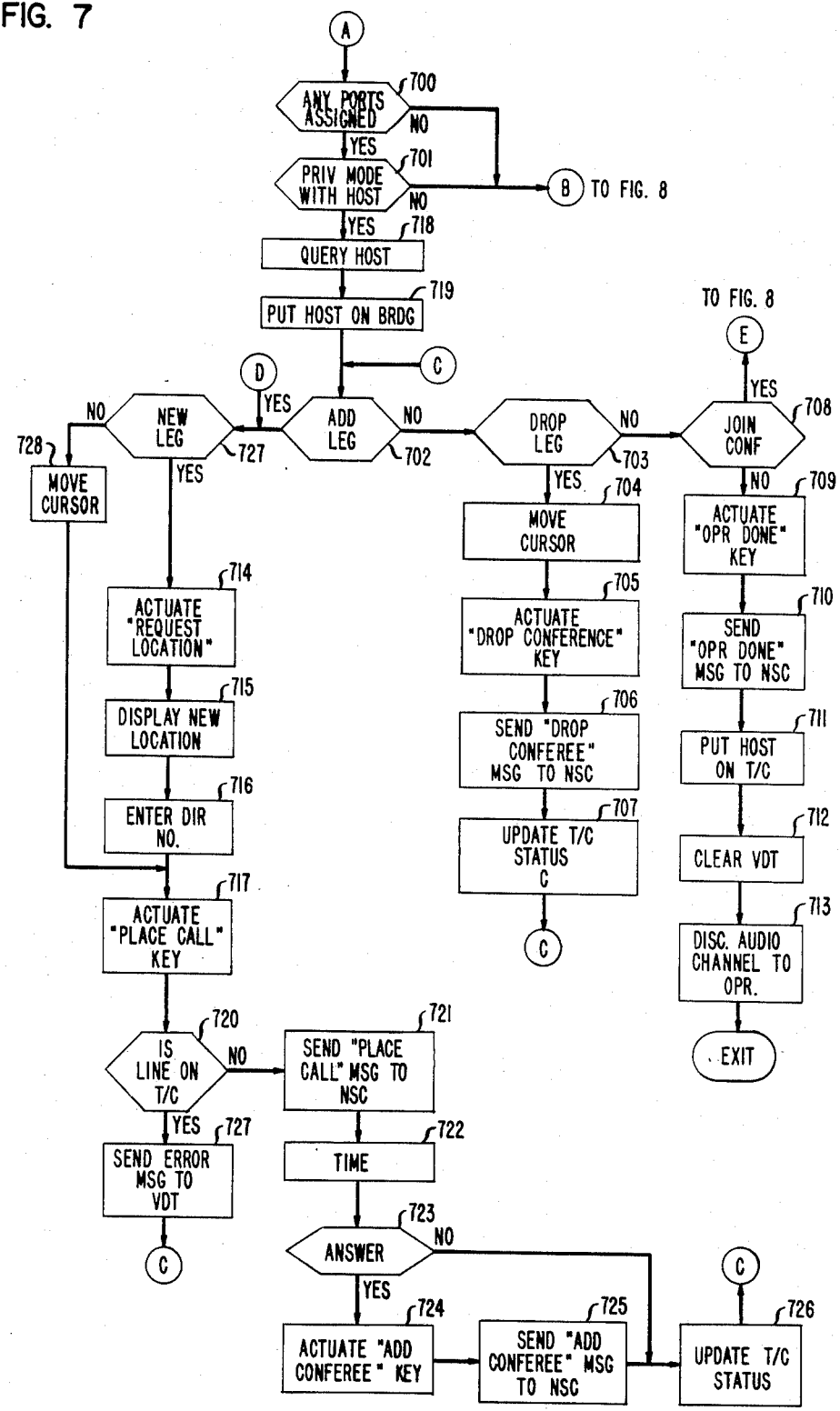

Returning to the call now being described, it has been assumed that the host has summoned an operator, the operator has answered the call and ordered the conference details displayed on the screen. As shown in FIG. 7 central control 120 ascertains if any ports have been assigned to the conference and whether or not the conference state is in a privacy mode as shown in boxes 700 and 701. In the example being described, the conference is assumed to be active and the host has gotten off the bridge to summon the operator. Consequently, the host is in a privacy mode with the operator and the "yes" branch of box 701 is executed.

While in the privacy mode with the host, the operator can query the host to ascertain what assistance the host requires (box 718). For example, if the host wishes to add a conferee, the operator ascertains whether this is a new conferee to be added or whether a conferee that has disconnected has to be reconnected to the bridge and then puts the host back on the bridge (box 719).

If the operator is requested to reconnect a dropped conferee, the operator moves the cursor (box 728) to the position on the screen that represents the dropped conference leg. The operator then actuates the PLACE CALL key as shown in box 717. If the host wishes the operator to add a new conferee to the conference, the operator actuates the REQUEST LOCATION key as shown in box 714. The cursor on the video display terminal is moved to the new vacant location on the screen (box 715) and the operator enters the directory number of the party that is to be added to the conference using the alphanumeric keyboard. The operator then actuates the PLACE CALL key as shown in box 717.

A check is then made by central control 120 in the teleconferencing support system to ascertain if the line that the operator is trying to add to the bridge is already on the bridge. If the line is already on the bridge an error message is displayed to the operator as set forth in box 727. If not, a "place call" message is sent by central control 120 to a network service complex processor 201. The "place call" message includes the conference identification, the directory number of the party being summoned, billing information, etc.

In response to this message, processor 201 issues orders to the toll switching system 202 to establish a connection to the party being summoned to the conference. Central control 120 now begins a timing function waiting for answer supervision from the called party as shown in box 723. When answer supervision is detected by the toll switching system and forwarded over a CCIS link 232, network services complex processor 201 sends an appropriate message to the teleconferencing operator support system via data links 262 and 263. In addition, processor 201 issues orders to the time slot interchange 224 and the audio bridge system 226 to connect the called party in a privacy mode with the operator's audio link. This is accomplished by establishing a two-party conference between the operator and the new conferee via audio bridge system 228. By utilizing the audio bridge to interconnect the operator with a conferee in the privacy mode, the echo cancellers, signal detectors and other apparatus of the audio bridge furnish the same high quality of transmission that is furnished to the conferees on a regular conference. Thus, the conferees do not experience any noticeable change in transmission quality while conversing with the operator or other conferees.

The operator can now inform the new conferee that the conferee is being summoned to the conference, and by actuating the ADD CONFEREE key (box 724) the teleconferencing operator support system sends an "add conferee" message to the network services complex and updates the status of the conference (box 726).

In response to the "add conferee" message the network services complex sends orders to the time slot interchange 224 and the audio bridge system 228 disconnecting the new conferee from a two-party conference with the operator and reconnecting the new conferee to the appropriate conference designated by the message.

The conference status now reflects the fact that the new conference is on the conference and no longer in a privacy mode with the operator.

At this point in the progress of the call being described, the host has summoned the operator and requested that a new conferee be added to the conference. The operator fulfills this request by putting the host back on the bridge and causing a call to be originated from the network services complex to the new conferee. After conversing with the new conferee in the privacy mode, the operator adds the conferee to the designated conference.

If the host had requested that additional conferees be added to the bridge the operator can initiate calls to these conferees by once again actuating the REQUEST LOCATION key (box 714). The sequence of events represented by boxes 715–717 and 720–726 is then executed as previously described.

If the operator wishes to force a conferee off the bridge, the "no" branch of box 702 and "yes" branch of box 703 are executed. The operator then moves the cursor on the video display terminal (box 704) to a particular line that is on the conference. The operator can actuate the PRIVACY MODE key and converse with the conferee before actuating the DROP CONFEREE key. Actuation of the DROP CONFEREE key is interpreted by the teleconference operator support system which sends a "drop conferee" message to the network services complex processor 201. In response to this message processor 201 forces the disconnect of the line that was indicated by the cursor on the video display terminal and identified by the message transmitted from the teleconference operator support system.

Figure 8:
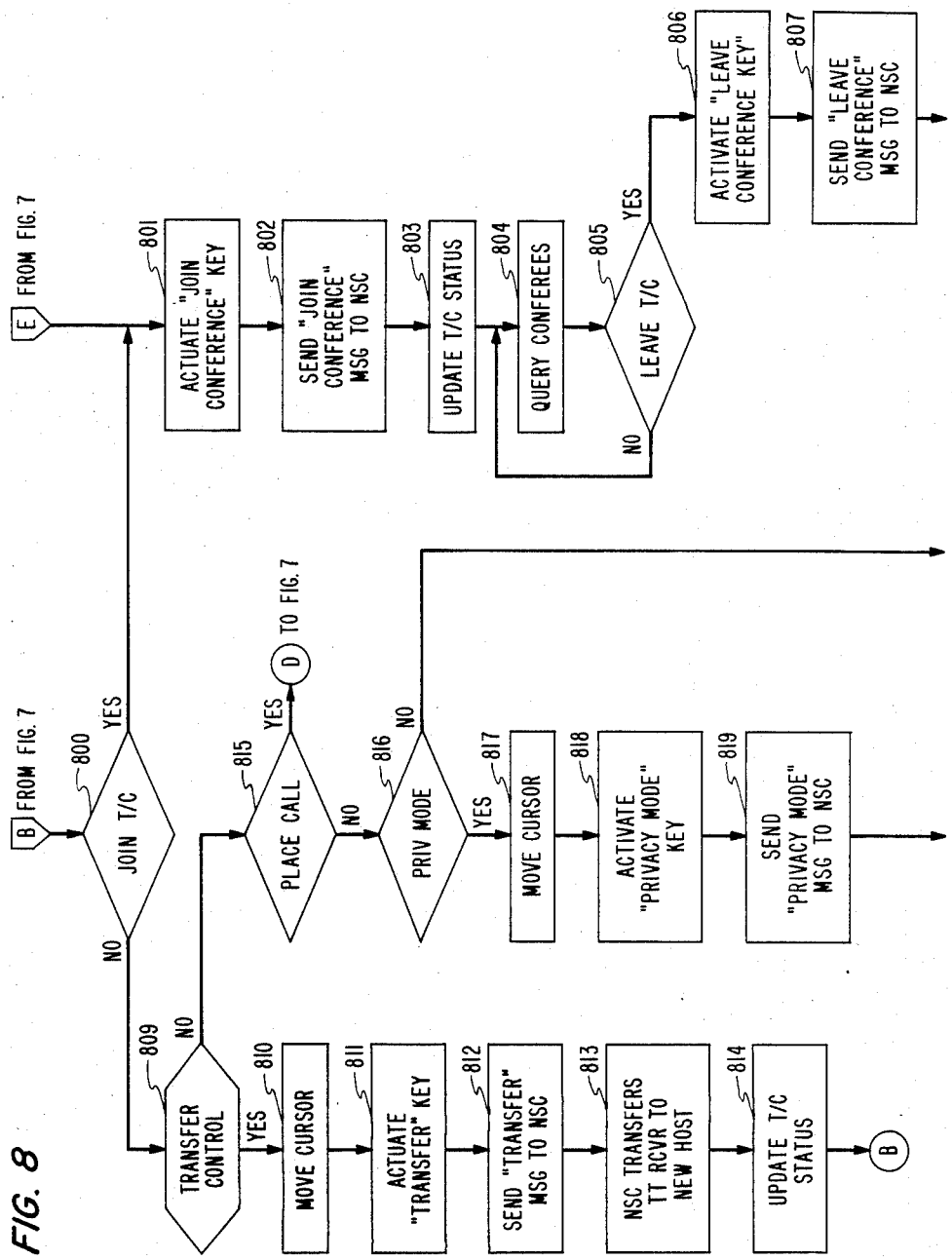
Figures 9, 10:
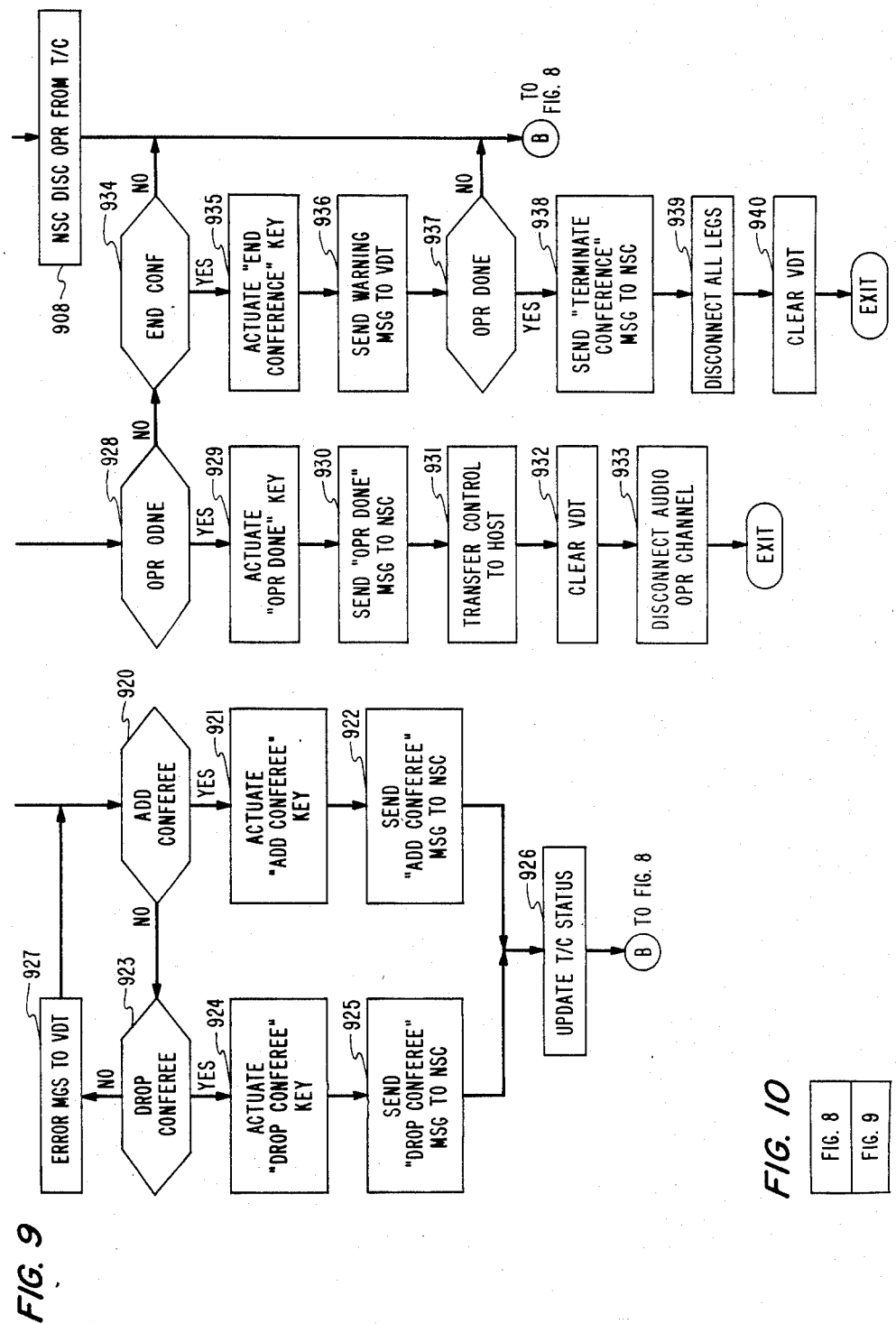

If the operator has completed the task of adding and-/or dropping legs at the request of the host, the operator can join the conference by actuating the JOIN CONFERENCE key as shown in box 708. This causes a "join conference" message to be sent to the network services complex. The network services complex processor 201 responds by ordering time slot interchange 224 and the audio bridge 228 to put the operator's audio channel on the conference designated by the "join conference" message. While on the bridge the operator can ascertain if further operator assistance is required, but in order to take any action with respect to the lines connected to the bridge or summon additional lines, the operator must actuate a LEAVE CONFERENCE key which causes a "leave conference" message to be transmitted by the teleconferencing operator support system to the network services complex 200. These operations of joining and leaving the bridge are pictorially represented by boxes 800-807 in FIG. 8 and box 908 in FIG. 9 when FIGS. 8 and 9 are arranged according to FIG. 10.

While the operator is off the bridge, the operator can exercise many options with respect to the particular conference whose details are presented to the operator on the video display terminal. For example, the operator may wish to transfer control from the host to another conferee on the bridge. This is accomplished by moving the cursor on the video display terminal to the newly designated controller, i.e., host. The operator can then actuate the PRIVACY MODE key and converse with the new host before actuating the TRANSFER CONTROL key causing a "transfer control" message to be sent to the network services complex.

The network services complex responds to the "transfer control" message by disconnecting the touchtone receiver from the present host and connecting a receiver to the leg associated with the proposed host, and the central control 120 updates the conference details at the video display terminal to reflect which leg is now in control of the conference. This sequence of events is set forth in boxes 809-814 of FIG. 8.

If the operator desires to place a call to another conferee, the "yes" branch of box 815 is executed and the operator can actuate the REQUEST LOCATION key (box 714) to move the cursor on the video display terminal to a new line location. The sequence of events set forth in boxes 715-717 and 720-726 is then executed to establish a conference channel to the conferee whose directory number has been entered by the operator.

Should the operator desire to exercise other control over any of the conferees, the operator engages the conferee in a privacy mode. This is accomplished by the operator moving the cursor on the video display terminal to the line on the screen which identifies the conferee that the operator wishes to control and then operating the PRIVACY key. Actuation of the PRIVACY key causes a "privacy mode" message to be sent to the network services complex processor 201 (box 819) and this message includes the privacy mode command, the conference identification and the leg identification. The network services complex processor responds by issuing orders to the appropriate peripheral units causing the conferee leg to be transferred off the conference bridge and put on a two-party conference with the operator's audio channel.

Once in a privacy mode the operator can converse with the conferee, add the conferee back on the conference bridge or force the disconnect of the conferee as set forth in boxes 920-927 in FIG. 9. Depending on the action taken by the operator, the status of the teleconference is updated as shown in box 926.

The above method of singling out and controlling individual parties on a conference is particularly useful in conferencing where the identity of the conferee is ambiguous. For example, when a dial-up conference is established by a conference host, the host successively dials the directory number of each conferee, and the network services complex establishes calls to the conferees using these directory numbers. Some of the conferees, however, may be served by a private branch exchange that is not equipped with direct inward dialing. Consequently, the host merely dials the main directory number of the private branch exchange and is connected to the private branch exchange attendant who will then forward the call to the appropriate extension serving the desired conferee. Thus, on a host generated dial-up conference, the conference details recorded in the network services complex may only indicate that several legs are connected to the same directory number, i.e., the main directory number of the private branch exchange.

Of course, if the operator had established the dial-up conference, the operator could ascertain the identity of the conferee when the conferee responded and the operator could then enter in the extension number or the name of the conferee associated with each leg to avoid any ambiguity.

In either case, once an operator is summoned to assist on the conference, the full conference details are displayed to the operator and the operator can select a leg independently of the directory number used to establish a leg. For example, as shown in the table in FIG. 3, the second and third legs of the conference depicted therein were accessed using the same directory numbers, i.e., 212-555-1234. When the operator displays this information on the video display terminal of the position, the operator has individual access to these legs and can control them separately by moving the cursor on the terminal to each of the legs. Moreover, had an operator originally established the conference or once having identified the conferee on a particular leg, the operator can use the alphanumeric keyboard to enter the conferee's name, extension number, or some other notation to distinguish between the conferees.

Also, it should be noted in FIG. 3 that the leg status of each leg indicates that leg 1 is the conference host and in the privacy mode with the operator (PRIV), legs 2 and 3 are conferees that are presently connected to the bridge ("ONCF"), but that leg 4 is associated with a conferee that has disconnected ("DROPPED").

The ability to control individual conference legs from the operator's terminal can be advantageously used to remove unwanted conferees from a bridge, to single out defective conference legs that may interfere with the transmission on a bridge, establish a new host, reestablish legs that have dropped, etc.

Returning now to a description of other options available to the operator, as shown in FIGS. 8 and 9, if the operator does not wish to transfer control of the conference, place a new call or converse with a conferee in the privacy mode, the operator can disconnect from the conference by actuating the position OPERATOR DONE key. In response to the operation of this key, the teleconferencing operator support system sends an "operator done" message to the network service complex and clears the video display terminal.

At the network services complex the "operator done" message causes the processor thereat to transfer control of the conference back to the designated host and disconnect the audio channel from the operator's position.

Should the operator desire to end the conference the operator actuates the END CONFERENCE key (box 935). Before the conference is terminated the teleconference operator support system 161 displays a warning message on the video display terminal to caution the operator that the conference is about to be terminated. The operator must thereafter actuate the OPERATOR DONE key before the conference is terminated. services complex which responds by disconnecting all legs of the conference that have been identified by the message.

In summary, a dial-up conference arrangement has been disclosed wherein the details of conference legs are displayed at an operator position to permit an operator to identify the conferees, independently of the directory number used to access the conference legs. Thus, in the illustrative embodiment, the position of the leg on the display, the name of the conferee, the number of the PBX extension serving the conferee or the status of the conference leg (dropped, on conference, host, etc.) as displayed can be used to uniquely identify the conferee.

Of course, it will be understood that the arrangement described in the foregoing is merely illustrative of the application of the principles of the invention and numerous other arrangements may be devised by those skilled in the art without departing from the spirit and scope of the invention.

APPENDIX A

| Present State | | Event Received | Action | Screen Action | Next State |
|---|---|---|---|---|---|
| 1. Idle | A | Get T/C ID | Send "Get T/C Details" msg. to TOSS | | 2 |
| | B | REQ. CONF. | | Display request form | 1 |
| | C | DONE | | Clear | 1 |
| | D | Other | | Display error msg. | 1 |
| | E | ENTER | Send "Look for Bridge" msg. to NSC | Display "Wait" message | 3 |
| 2. Get details | A | "T/C Info" msg. rec'd., ID valid, ports assigned opr. in "PRIV" with HOST | Send "Sync Complete" msg. to NSC | Display T/C details | 5 |
| | B | "T/C Info" msg. rec'd., ID is valid ports assigned & opr. not in "PRIV" | Send "Sync Complete" msg. to NSC | Display T/C Details | 7 |
| | C | "T/C Info." msg. rec'd., ID valid & no ports assigned | Send "Sync Complete" msg. to NSC | Display T/C details | 11 |
| | D | ID invalid | | Display error msg. | 1 |
| | E | Other | | | 2 |
| 3. Waiting for Bridge Confirmation | A | "Bridge Available" | Send "Save T/C Details" msg. | Display "Facilities Secured" msg. | 4 |
| | B | "Bridge Unavailable" | | Displays "Facilities Not Available" | 1 |
| | C | Cancel Form Entry | | Clear screen | 1 |
| | D | DONE | | Displays "Not Ready" msg. | 3 |
| | E | Other | | Display error msg. | 3 |
| 4. Waiting for Operator Done | A | DONE | | Clear screen | 1 |
| | B | Other | | Display error msg. | 4 |
| 5. T/C Details on Screen "PRIV" with HOST | A | ADD | Sends "Add Conferee" msg. to NSC | Update status | 7 |
| | B | DONE | (1) Sends "Done" | Clear screen | 1 |

APPENDIX A-continued

| Present State | Event Received | Action | Screen Action | Next State |
|---|---|---|---|---|
| | | msg. to NSC (2) Sends "Remove" msg. to TOSS | | |
| | C REQ LOC | | Display new line | 5 |
| | D Other | | Display error msg. | 5 |
| 6. T/C Details on Screen in "PRIV" mode | A ADD & cursor on line with "PRIV" status | Send "Add Conferee" msg. to NSC | Update line status | 7 |
| | B DROP & cursor on line with "PRIV" status | Send "Drop Conferee" msg. to NSC | Update line status | 7 |
| | C Other | | Display appropriate error message | 6 |
| 7. T/C Details on Screen Not in "PRIV" | A JOIN CONF. | Sends "Join Conference" msg. to NSC | Update operator status | 8 |
| | B PL CALL & cursor on line not "ONCE" or "PRIV" | Send "Place Call" msg. to NSC | | 9 |
| | C PRIV & cursor on line on T/C | Send "Private Mode" msg. to NSC | Updates line status | 6 |
| | D REQ LOC | | Displays new line | 7 |
| | E TRSF CNTL & cursor on line with "ONCF" status | Send "Transfer Control" msg. to NSC | Updates T/C status | 7 |
| | F Other | | Display error msg. | 7 |
| | G END CONF | | Displays "Warning" msg. | 10 |
| | H DONE | (1) Send "Operator Done" msg. to TOSS (2) Send "Remove T/C Details" msg. to TOSS | Clears screen | 1 |
| 8. Operator on Conference | A LEAVE CONF | Send "Leave Conference" msg. to NSC | Updates operator status | 7 |
| | B REQ LOC | | Display new line | 8 |
| | C Other | | Display error msg. | 8 |
| 9. Waiting for NSC Answer | A Answer from NSC | | Update status to "PRIV" | 6 |
| | B DROP & cursor on same line as when PL CALL was hit | Send "Drop Conference" message | Update status to "DA" | 7 |
| | C NSC time out | | Update status to "DA" | 7 |
| | D Other | | Display error msg. | 9 |
| 10. Confirm End Conference Not in "PRIV" | A Any key other than DONE | | Removes "End Conference Warning" msg. | 7 |
| | B DONE | (1) Send "Terminate T/C" msg. to NSC (2) Send "Remove T/C Details" msg. to TOSS | Clear screen | 1 |
| 11. No Touch Tone Ports Assigned | A DONE | (1) Send "Terminate T/C" msg. to NSC (2) Send "Remove T/C Details" msg. to TOSS | Clear Screen | 1 |
| | B Other | | Display error msg. | 11 |

What is claimed is:

summoning an operator position in response to a request from said bridge, transmitting to said operator position a data message containing the directory number of and the status of all stations originally connected to the bridge.

identifying at said operator position one of said stations independently of the directory numbers transmitted thereto, and transmitting a message to said bridge from said operator position to control the one identified station.

2. For use in a communication system having a plurality of stations, a conference bridge and means for interconnecting said stations to said bridge for conferencing, a method for controlling the connection of said stations to the bridge comprising the steps of detecting the disconnection of one of said stations from the bridge, transmitting to a remote operator position in response to said detection a data message containing the directory number of and the status of all stations originally connected to the bridge, identifying at said operator position said one station independently of the directory number transmitted thereto, and transmitting a control message from the operator position to the bridge to effect thereat the reconnection of the disconnected one of said stations.

3. The method set forth in claim 2 wherein the step of detecting the disconnect of said station includes the step of informing another station connected to said bridge of said disconnection, causing said other station to establish an audio connection to said operator position, and transmitting an announcement of said conference identity over said audio connection.

4. The method set forth in claim 1 or 2 wherein the step of transmitting said message includes the step of transmitting indicia unique to each said station.

5. The method set forth in claim 1 or 2 wherein the step of identifying one of said stations comprises the step of establishing a voice connection between said operator position and said one station independent of any other stations connected to said bridge.

6. The method set forth in claim 1 or 2 further comprising the step of visually displaying the contents of said data message at said operator position and wherein the step of identifying said one station includes the step of indicating on said visual display a predetermined status unique to said one station.

7. For use in a communication system having a plurality customer stations, a conference bridge and means for interconnecting said stations to said bridge for conferencing, a method for controlling the connection of said stations to the bridge comprising the steps of detecting when one of said stations has disconnected from the bridge, informing at least another of said stations still connected to said bridge that said one station has disconnected, having said other station summon an operator at a remote operator position, transmitting to said remote position a data message containing the directory number of each station originally connected to the bridge and whether each said station is currently disconnected from the bridge, displaying the contents of the data message on a video display terminal at the operator position, and generating at said position a first control signal for transmittal to said bridge by positioning the terminal cursor to the display representing said one station.

8. The invention defined in claim 7 wherein the step of transmitting said first control signal includes the step of alerting said one station.

9. The invention defined in claim 8 further comprising the step of coupling together said operator position and said one station in response to an answer signal from said one station.

10. The invention defined in claim 9 further comprising the step of generating a second control signal for transmittal to said bridge to cause said bridge to reconnect said one station to said bridge.

11. The invention defined in claim 10 wherein the step of generating said control signals includes the step of identifying said one station as indicated by the position of a cursor on said terminal display and operating a function key individually associated with the particular control signal generated.

12. For use in a communication system having a plurality customer stations, a conference bridge and means for interconnecting said stations to said bridge for conferencing, a method for controlling the connection of said stations to the bridge comprising the steps of causing said bridge to summon an operator at a remote operator position, transmitting to said remote position a data message containing the directory number of each station originally connected to the bridge and whether each said station is currently disconnected from the bridge, displaying the contents of the data message on a video display terminal at the operator position, and generating at said position one of a plurality of control signals for transmittal to said bridge by positioning the terminal cursor to the display representing said one station.

13. The invention defined in claim 12 wherein the step of generating one of said control signals comprises the step of identifying said one station as indicated by the position of a cursor on said terminal display and operating a selected one of a plurality of function keys individually associated with one of the particular control signals generated.

14. The invention defined in claim 13 further including the step of initiating a call to said identified station in response to one of said control signals.

15. The invention defined in claim 13 further including the step of disconnecting said identified station from said conference in response to one of said control signals.

16. The invention defined in claim 13 further including the step of coupling said identified station with said operator position exclusive of said conference bridge in response to one of said control signals.

17. The invention defined in claim 12 further including the step of putting the bridge under the control of said identified station in response to one of said control signals.

* * * * *

UNITED STATES PATENT AND TRADEMARK OFFICE
CERTIFICATE OF CORRECTION

PATENT NO. : 4,691,347

DATED : September 1, 1987

INVENTOR(S) : K. S. Stanley, D. F. Winchell

It is certified that error appears in the above-identified patent and that said Letters Patent is hereby corrected as shown below:

Column 19, line 1; entire first paragraph is missing. Should be

"1. For use in a communication system having a plurality of stations, a conference bridge and means for interconnecting said stations to said bridge for conferencing, a method of controlling stations connected to the bridge comprising the steps of"

Signed and Sealed this

Seventeenth Day of March, 1992

Attest:

HARRY F. MANBECK, JR.

*Attesting Officer*          *Commissioner of Patents and Trademarks*